United States Patent [19]

Futami et al.

[11] Patent Number: 6,090,899

[45] Date of Patent: *Jul. 18, 2000

[54] TERPOLYMERS OF UNSATURATED SULFONATES, N-VINYLAMIDES AND ETHYLENIC MONOMERS

[75] Inventors: Takanori Futami; Tetsuhiko Yamaguchi, both of Kawasaki; Hirotaka Tagoshi, Tokyo, all of Japan

[73] Assignee: Showa Denko K.K., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/694,456

[22] Filed: Aug. 7, 1996

[30] Foreign Application Priority Data

Aug. 8, 1995 [JP] Japan ..................... 7-202483

[51] Int. Cl.$^7$ .................... C08F 228/02; C08F 220/52
[52] U.S. Cl. .................... 526/240; 526/287; 526/307.1
[58] Field of Search .................... 526/240, 287, 526/307.1, 307.2

[56] References Cited

U.S. PATENT DOCUMENTS

| | | | |
|---|---|---|---|
| 4,309,523 | 1/1982 | Engelhardt | 526/240 |
| 4,587,283 | 5/1986 | Hille | 526/287 |
| 5,116,421 | 5/1992 | Ganguli . | |

FOREIGN PATENT DOCUMENTS

| | | | |
|---|---|---|---|
| 0023712 | 2/1981 | European Pat. Off. . | |
| 0331045 | 9/1989 | European Pat. Off. . | |
| 0444489 | 9/1991 | European Pat. Off. . | |
| 0577931 | 1/1994 | European Pat. Off. . | |
| 8319144 | 12/1996 | European Pat. Off. . | |
| 5-139806 | 6/1993 | Japan | C04B 24/38 |
| 6-293542 | 10/1994 | Japan | C04B 24/22 |
| 8-12397 | 1/1996 | Japan | C04B 24/26 |

*Primary Examiner*—Christopher Henderson
*Attorney, Agent, or Firm*—Sughrue, Mion, Zinn, Macpeak & Seas, PLLC

[57] ABSTRACT

A high-flow concrete additive comprises a polymer of 10–100 wt % of an N-vinylacetamide, 0–50 wt % of a compound $CH_2=CR^3X^1R^4SO_3X^2$ wherein $R^3$ is hydrogen or methyl, $R^4$ is alkylene of 1 to 4 carbon atoms, $X^1$ is CONH or COO, and $X^2$ is hydrogen, an alkali metal, ammonium salt or organic ammonium salt, and 0–40 wt % of a compound $CH_2=CR^5X^3$ wherein $R^5$ is hydrogen or methyl and $X^3$ is CN, $COOR^6$, $CONH_2$, $CONHR^7$, $CONR^8R^9$, $COR^{10}$, $OCOR^{11}$ or $OR^{12}$, in which $R^6$ is hydrogen, an alkali metal, ammonium salt, organic ammonium salt or alkyl group of 1 to 4 carbon atoms, $R^7$, $R^8$ and $R^9$ are alkyl groups of 1 to 4 carbon atoms, and $R^{10}$, $R^{11}$ and $R^{12}$ are alkyl groups of 1 to 4 carbon atoms.

4 Claims, 1 Drawing Sheet

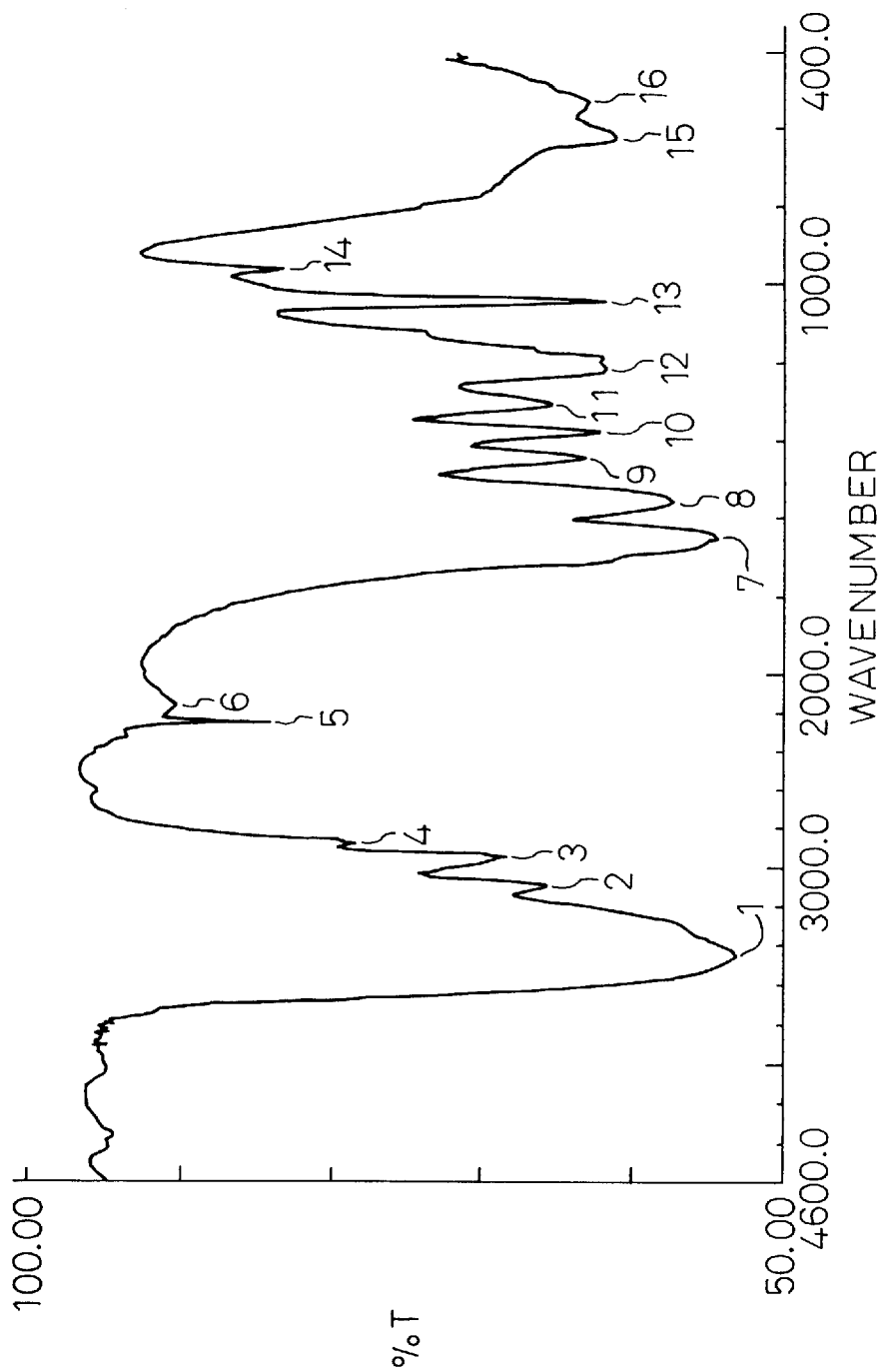

TERPOLYMERS OF UNSATURATED SULFONATES, N-VINYLAMIDES AND ETHYLENIC MONOMERS

BACKGROUND OF THE INVENTION

1. Field of the Invention

The present invention relates to a high-flow concrete additive and a concrete material containing the additive. More specifically, it relates to a high-flow concrete additive which is added to concrete structures for civil engineering, architecture and concrete articles, in order to provide high flowability, high self-compactability and high segregation resistant properties to fresh concrete, reduce or render unnecessary compaction during placement, and minimize noise during construction for an improved working environment while also facilitating concrete placement, as well as to a polymer which may be used as such an additive.

2. Description of the Related Art

Recent years have seen an increase in the demand for high-flow concrete, due to the greater complexity and diversification of concrete structures for simplification of operations at construction sites, as measures against noise during shake compaction, as preventive measures against earthquakes and for beautification of the environment. Fresh concrete has traditionally been given higher flowability by addition of water or water reducing agents. However, this alone causes segregation of the concrete material, which allows intermixture with the coarse aggregates and thus reduces the self-compactability and makes it impossible to obtain uniform concrete, resulting in lower concrete quality. For this reason, addition of water-soluble polymers is being investigated for the purpose of controlling such material segregation.

Commonly used water-soluble polymers include cellulose derivatives such as methyl cellulose ether, hydroxypropylethyl cellulose ether, methylhydroxyethylmethyl cellulose ether, hydroxyethyl cellulose ether and hydroxypropyl cellulose ether, as well as polysaccharides, curdlan, dextran, starch, xanthan gum, polyacrylamide, and the like. However, when these water-soluble polymers are added in an amount sufficient to control material segregation, they increase the viscosity of the fresh concrete, causing the problem of lower flowability (Japanese Unexamined Patent Publication No. 5-139806).

When used together with water reducing agents which are used to increase the flowability of fresh concrete, they usually interact with the water reducing agents to obstruct the flowability. This obstruction makes it extremely difficult to ensure both the desired viscosity and flowability (Japanese Unexamined Patent Publication No. 6-293542, No.8-12397). In addition, cellulose derivatives and other saccharides cause a variety of problems including long-term storage difficulties due to decay while in aqueous solution.

Japanese Examined Patent Publication No. 2-23566 discloses a copolymer of an N-vinylacetamide compound and 2-acrylamido-2-methylpropanesulfonate as a water-soluble polymer for control of material separation, but since it is used as a water-soluble boring aid, the reduction in flowability over time has not been considered a problem.

SUMMARY OF THE INVENTION

It is an object of the present invention to provide a concrete additive which provides continuous and stable high flowability, satisfactory self-compactability and material segregation resistance to fresh concrete without obstructing the flowability, and reduces or renders unnecessary compaction during placement, even when used in combination with a water reducing agent, as well as to provide a concrete material having these properties.

As a result of much research in light of these circumstances, it was found that N-vinylcarboxylic amide-based water-soluble polymers not only provide high flowability, self-compactability and segregation resistance to fresh concrete without obstructing the flowability, even when used in concentrations sufficient to control material separation and even when used in combination with water reducing agents, but they also reduce or render unnecessary compaction during placement without obstructing the flowability, even when used in combination with water reducing agents.

That is, the present invention provides a high-flow concrete additive comprising a polymer containing:

10–100 wt % of a unit derived from a compound represented by the following general formula (1):

wherein $R^1$ and $R^2$ may be the same or different, and represent a hydrogen atom or methyl group, 0–60 wt % of a unit derived from a compound represented by the following general formula (2):

wherein $R^3$ is a hydrogen atom or methyl group, $R^4$ is a linear or branched alkylene group of 1 to 4 carbon atoms, $X^1$ is CONH or COO, and $X^2$ is hydrogen, an alkali metal, ammonium salt or organic ammonium salt, and 0–40 wt % of a unit derived from a compound represented by the following general formula (3):

wherein $R^5$ a hydrogen atom or methyl group and $X^3$ is CN, $COOR^6$, $CONH_2$, $CONHR^7$, $CONR^8R^9$, $COR^{10}$, $OCOR^{11}$ or $OR^2$, in which $R^6$ represents a hydrogen atom, alkali metal, ammonium salt, organic ammonium salt, or alkyl group of 1 to 4 carbon atoms which alkyl group may be unsubstituted or substituted by at least one member selected from the group consisting of OH, $N(CH_3)_2$ and $N(C_2H_5)_2$; $R^7$, $R^8$ and $R^9$ each independently represent an alkyl group of 1 to 4 carbon atoms which alkyl group may be unsubstituted or substituted by at least one member selected from the group consisting of OH, $N(CH_3)_2$ and $N(C_2H_5)_2$; and $R^{10}$, $R^{11}$ and $R^{12}$ each independently represent an alkyl group of 1 to 4 carbon atoms, the total of the units derived from the compounds represented by general formulas (1) to (3) being 100 wt %.

The present invention also provides a polymer containing:

40–89 wt % of a unit derived from a compound represented by the following general formula (1):

wherein $R^1$ and $R^2$ may be the same or different, and represent a hydrogen atom or methyl group, 10–50 wt % of a unit derived from a compound represented by the following general formula (2):

wherein $R^3$ is a hydrogen atom or methyl group, $R^4$ is a linear or branched alkylene group of 1 to 4 carbon atoms, $X^1$ is CONH or COO, and $X^2$ is hydrogen, an alkali metal, ammonium salt or organic ammonium salt, and 1–30 wt % of a unit derived from a compound represented by the following general formula (3):

$$CH_2=CR^5X^3 \qquad (3)$$

wherein $R^5$ is a hydrogen atom or methyl group and $X^3$ is CN, $COOR^6$, $CONH_2$, $CONHR^7$, $CONR^8R^9$, $COR^{10}$, $OCOR^{11}$ or $OR^2$, in which $R^6$ represents a hydrogen atom, alkali metal, ammonium salt, organic ammonium salt, or alkyl group of 1 to 4 carbon atoms which alkyl group may be unsubstituted or substituted by at least one member selected from the group consisting of OH, $N(CH_3)_2$ and $N(C_2H_5)_2$; $R^7$, $R^8$ and $R^9$ each independently represent an alkyl group of 1 to 4 carbon atoms which alkyl group may be unsubstituted or substituted by at least one member selected from the group consisting of OH, $N(CH_3)_2$ and $N(C_2H_5)_2$; and $R^{10}$, $R^{11}$ and $R^{12}$ each independently represent an alkyl group of 1 to 4 carbon atoms, the total of the compounds represented by general formulas (1) to (3) being 100 wt %.

BRIEF DESCRIPTION OF THE DRAWING

FIG. 1 is a KBr-disk infrared absorption spectrum of the copolymer produced according to Example 2.

DESCRIPTION OF THE PREFERRED EMBODIMENTS

According to the present invention, the compound represented by general formula (1) may be, for example, N-vinylformamide, N-vinylacetamide, N-methyl-N-vinylformamide or N-methyl-N-vinylacetamide, with N-vinylacetamide being particularly preferred. These compounds may be employed alone or as a mixture of two or more thereof.

The compound represented by general formula (2) may be, for example, 2-acrylamido-2-methyl-propanesulfonic acid, 2-acrylamidoethanesulfonic acid, 2-methyacrylamidoethanesulfonic acid, 3-methyacrylamidopropanesulfonic acid, acrylic acid sulfomethyl ester, methacrylic acid sulfomethyl ester, 2-ethylacrylate sulfonic acid, 2-ethylmethacrylate sulfonic acid, 3-propylacrylate sulfonic acid, 3-propylmethacrylate sulfonic acid, 2-methyl-3-propylacrylate sulfonic acid, 2-methyl-3-propylmethacrylate sulfonic acid, 1,1'-dimethyl-2-ethylacrylate sulfonic acid, 1,1'-dimethyl-2-ethylmethacrylate sulfonic acid, and their salts. These compound may be employed alone or as a mixture of two or more thereof.

The compound represented by general formula (3) may be, for example, methyl acrylate, ethyl acrylate, propyl acrylate, 2-hydroxyethyl acrylate, acrylamide, N,N-dimethylaminoethyl acrylate, N,N-dimethylaminopropylacrylamide, acrylonitrile, methyl vinyl ketone, ethyl vinyl ketone, propyl vinyl ketone, vinyl acetate, methyl vinyl ether, ethyl vinyl ether, propyl vinyl ether, methyl methacrylate, ethyl methacrylate, propyl methacrylate, 2-hydroxyethyl methacrylate, 2-hydroxypropyl methacrylate, N,N-dimethylaminoethyl methacrylate, methacrylamide, N-isopropylacrylamide, N,N-dimethylaminopropyl methacrylamide, N,N-dimethylacrylamide and N,N-diethylacrylamide, with acrylonitrile being preferred. These compound may be employed alone or as a mixture of two or more thereof.

The high-flow concrete additive comprising the N-vinylcarboxylic amide-based water-soluble polymer of the invention consists of units derived from the compounds represented by aforementioned general formulas (1) to (3), in a proportion of at least 10 wt % of the unit derived from the compound represented by general formula (1), 0–60 wt % of the unit derived from the compound represented by general formula (2) and 0–40 wt % of the unit derived from the compound represented by general formula (3) (such that the total of the units derived from the compounds represented by general formulas (1) to (3) is 100 wt %), and it may consist entirely of a unit derived from a compound represented by general formula (1). As a copolymer it comprises preferably 40–89 wt %, and more preferably 50–70 wt %, of a unit derived from the compound represented by general formula (1), preferably 10–50 wt %, and more preferably 20–40 wt %, of a unit derived from the compound represented by general formula (2) and preferably 1–30 wt %, more preferably 5–20 wt %, of a unit derived from the compound represented by general formula (3).

If the water-soluble polymer of the high-flow concrete additive contains less than 10 wt % of the unit derived from a compound represented by general formula (1), then the molecular weight of the water-soluble polymer will not provide sufficient viscosity to the fresh concrete.

If the unit derived from a compound represented by general formula (2) is present at greater than 60 wt %, then it becomes difficult to achieve sufficient viscosity, leading to material segregation. If the unit derived from a compound represented by general formula (3) is present at greater than 40 wt %, then the hydrophilicity of the polymer is lower and thus viscosity and flowability cannot be imparted to the fresh concrete, leading to material segregation.

The polymer used as the concrete additive of the invention has a 20° C., 1.2 wt % aqueous solution viscosity of between 20 cps and 20,000 cps, preferably between 20 cps and 2000 cps, and more preferably between 20 cps and 200 cps. A solution viscosity of below 20 cps is not preferred as it results in material segregation. On the other hand, a viscosity of over 20,000 cps tends to result in reduced flowability. The 1.2% aqueous solution viscosity of the polymer of the invention is the value for the viscosity of a solution of the polymer adjusted to a concentration of 1.2 wt %, using a supernatant solution obtained by adding 3 liters of water to 30 g of Portland cement, stirring for 30 minutes and allowing the mixture to settle, and it is measured with a Brookfield rotating viscometer (hereinafter referred to as B viscometer) at 60 rpm.

Since the polymer of the invention has a nonionic hydrophilic group in the unit represented by general formula (1), it has good solubility in strongly alkaline cement water, and is also superior in terms of resistance to material segregation of the concrete composition.

The concrete additive of the present invention provides a high flowability to the fresh concrete, which may preferably be represented in terms of a slump flow value (0 minute) of 55 cm or more, more preferably, 60 cm or more, as measured immediately after manufacture.

When high-flow concrete is used at a construction site, time is required to transport the concrete from the raw concrete factory to the construction site. Thus, it is important that no change occur in the flowability of the raw concrete immediately after manufacture until about 60 minutes afterwards. As an index thereof, a slump flow value (60 minutes) of 55 cm or greater, preferably 60 cm or greater is desired, measured when 60 minutes have passed after filling a slump cone with the raw concrete. From this viewpoint as well, the concrete additive of the invention can most desirably impart suitable flowability to concrete compositions (an initial slump flow value of 60 cm or greater) while also having excellent continuous stability (a slump flow value of 60 cm or greater after 60 minutes), and thus has ideal properties as a high-flow concrete additive. The slump flow value is measured according to JIS A1101: Method of Test for Slump of Concrete.

The method used to produce the high-flow concrete additive of the invention may be aqueous solution polymerization, reverse phase suspension polymerization, precipitation polymerization or the like, and it is not particularly restricted to these methods. The polymerization initiator used may be any common radical polymerization initiator, for example an azo-based initiator such as 2,2'-azobis(2-amidinopropane) dihydrochloride, 2,2'-azobis[2-(2-imidazolin-2-yl)propane] dihydrochloride, 2,2'-azobis[2-(3,4,5,6-tetrahydropyrimidin-2-yl)propane] dihydrochloride, 2,2'-azobis[2-(5-hydroxy-3,4,5,6-tetrahydropyrimidin-2-yl)propane] dihydrochloride, 4,4'-azobis(4-cyanovaleric acid), 2,2'-azobis(2-methylpropionamide) dihydrate or 2,2'-azobis[2-(N-benzylamidinopropane] dihydrochloride; a peroxide such as t-butylhydroperoxide or succinic peroxide; or a so-called redox-based initiator containing a peroxide or persulfate and a reducing agent such as triethanolamine or sodium thiosulfate in the same system.

The aqueous solution viscosity adjuster may be a compound with a chain transfer effect, such as n-butylmercaptan, triethylamine, isopropyl alcohol, ammonium thioglycolate or sodium hypophosphite.

A polymer obtained by aqueous solution polymerization may be dried and crushed into a powder. A polymer obtained by reverse-phase suspension polymerization may be filtered and dried into a powder. The resulting powder may either be added directly as a powder to the high-flow concrete mixture, or it may be predissolved in an aqueous solution.

The high-flow concrete additive of the invention may be used in combination with other agents such as a water reducing agent, AE water reducing agent or high-performance AE water-reducing agent. These agents may be any commonly used as concrete additives, but preferred agents include naphthalene sulfonate formaldehyde condensates, melaminesulfonate formaldehyde condensates, polycarboxylic acids and their esters or salts, polystyrene sulfonate, cement dispersants with a phenol skeleton (formaldehyde co-condensates of phenolsulfonate and another co-condensable monomer), cement dispersants composed mainly of aniline sulfonate (formaldehyde co-condensates of aniline sulfonate and another co-condensable monomer), and conventional high-performance water reducing agents. There are no particular restrictions on the proportion in which these agents are used, but an amount of 20- to 800-fold by weight, and preferably 100- to 400-fold by weight with respect to the high-flow concrete additive of the invention is general suitable.

The high-flow concrete additive of the invention is preferably added in an amount in the range of 0.005–0.8 wt % in terms of solid portion with respect to hydraulic cement and latent hydraulic compositions.

The high-flow concrete additive of the invention may be used in concrete materials which are cement hydraulic compositions for civil engineering, architecture and secondary articles. It may also be used as a mortar material.

The concrete material of the invention comprises a high-flow concrete additive with a concrete cement, coarse aggregate such as crushed stone, and fine aggregate such as blast furnace slag, fly ash, silica fume, etc., and publicly known additives may also be added thereto.

Possible additives include retarding agents, high early strength agents, accelerating agents, bubbling agents, foaming agents, water retention agents, thickening agents, water-proofing agents, antifoaming agents, water-soluble surfactants, and the like.

Concrete materials employing a high-flow concrete additive of the invention have both satisfactory initial flowability and continuous flowability, do not undergo bleeding or other material segregation and have excellent self-compactability and leveling properties, and are thus useful as materials for high-flow concrete.

The present invention will now be described in detail by way of the following examples and comparative examples which, of course, are not intended to restrict the scope of the invention. The infrared absorption spectra were measured using a JASCO FT/IR 8000 infrared spectrometer.

EXAMPLE 1

After placing 250 g of N-vinylacetamide in a glass reactor, 740 g of water was added thereto and dissolved. The dissolved oxygen was removed by nitrogen aeration in a 30° C. constant temperature bath, and then 0.15 g of 2,2'-azobis[2-(2-imidazolin-2-yl)propane] dihydrochloride dissolved in 10 g of water was added, and the reaction was conducted under nitrogen aeration. After completion of the reaction, the product was dried at 50° C. for 5 hours. The water was thoroughly removed, and a miniature crusher was used to make a powder of 100 mesh or smaller. The aqueous solution viscosity of the resulting copolymer at 1.2 wt % was 178 cps. Table 1 shows the results including the characteristic absorption of the polymer in the infrared absorption spectrum (KBr-disk).

EXAMPLE 2

After placing 30 g of 2-acrylamido-2-methyl-propanesulfonic acid in a glass reactor, 893 g of water was added thereto and dissolved. Sodium hydroxide was added to adjust the pH to 8, and then 60 g of N-vinylacetamide and 0.01 g of ammonium thioglycollate were dissolved therein. The reactor was immersed in a 50° C. constant temperature bath and the contents were vigorously stirred, and, after removing the dissolved oxygen by nitrogen aeration, 10 of acrylonitrile and 1.0 g of 2,2'-azobis(2-amidinopropane) dihydrochloride were added and the reaction was conducted under nitrogen aeration. The aqueous solution viscosity of the resulting copolymer at 1.2 wt % was 180 cps. The results are shown in Table 1.

EXAMPLE 3

After placing 48 g of 2-acrylamido-2-methyl-propanesulfonic acid in a glass reactor, 893 g of water was added thereto and dissolved. Sodium hydroxide was added to adjust the pH to 8, and then 47 g of N-vinylacetamide and 0.1 g of ammonium thioglycollate were dissolved therein. The reactor was immersed in a 60° C. constant temperature bath and the contents were vigorously stirred, and after removing the dissolved oxygen by nitrogen aeration, 5 g of acrylonitrile and 1.0 g of 2,2'-azobis(2-amidinopropane) dihydrochloride were added and the reaction was conducted under nitrogen aeration. The aqueous solution viscosity of the resulting copolymer at 1.2 wt % was 43 cps. The results are shown in Table 1.

EXAMPLE 4

After placing 30 g of 2-acrylamido-2-methyl-propanesulfonic acid in a glass reactor, 990 g of water was added thereto and dissolved. The pH was adjusted to 8 with sodium hydroxide, and then 70 g of N-vinylacetamide and 0.03 g of ammonium thioglycollate were dissolved therein. The reactor was immersed in a 50° C. constant temperature bath and the contents were vigorously stirred, and, after removing the dissolved oxygen by nitrogen aeration, 1.0 g of 2,2'-azobis(2-amidinopropane) dihydrochloride dissolved in 5 g of water was added and the reaction was conducted under nitrogen aeration. The aqueous solution viscosity of the resulting copolymer at 1.2 wt % was 53 cps. The results are shown in Table 1.

EXAMPLE 5

After placing 95 g of N-methyl-N-vinylacetamide, 5 g of methyl methacrylate and 0.0625 g of ammonium thioglycollate in a glass reactor, 360 g of water was added thereto and dissolved. The dissolved oxygen was removed by nitrogen aeration in a 20° C. constant temperature bath, and then 0.2 g of 2,2'-azobis[2-(2-imidazolin-2-yl)propane] dihydrochloride dissolved in 10 g of water was added and the reaction was conducted under nitrogen aeration. After completion of the reaction, the product was dried at 50° C. for 5 hours. The water was thoroughly removed, and a miniature crusher was used to make a powder of 100 mesh or smaller. The aqueous solution viscosity of the resulting copolymer at 1.2 wt % was 55 cps. The results are shown in Table 1.

EXAMPLE 6

After placing 20 g of 2-acrylamido-2-methyl-propanesulfonic in a glass reactor, 990 g of water was added thereto and dissolved. The pH was adjusted to 8 with sodium hydroxide, and then 78 g of N-vinylformamide, 2 g of N,N-dimethylacrylamide and 0.1 g of sodium hypophosphite were dissolved therein. The reactor was immersed in a 55° C. constant temperature bath and the contents were vigorously stirred, and after removing the dissolved oxygen by nitrogen aeration, 1.0 g of 2,2'-azobis(2-amidinopropane) dihydrochloride dissolved in 5 g of water was added and the reaction was conducted under nitrogen aeration. The aqueous solution viscosity of the resulting copolymer at 1.2 wt % was 183 cps. The results are shown in Table 1.

EXAMPLES 7–10

The monomers listed in Table 1 were reacted according to Example 2 for Examples 7, 8 and 10 and according to Example 5 for Example 9. The results are shown in Table 1.

COMPARATIVE EXAMPLE 1

After placing 70 g of 2-acrylamido-2-methyl-propanesulfonic in a glass reactor, 700 g of water was added thereto and dissolved. The pH was adjusted to 8 with sodium hydroxide, and then 20 g of N-vinylacetamide, 10 g of acrylonitrile and 0.25 g of sodium hypophosphite were dissolved therein. The reactor was immersed in a 50° C. constant temperature bath and the contents were vigorously stirred, and, after removing the dissolved oxygen by nitrogen aeration, 0.5 g of 2,2'-azobis(2-amidinopropane) dihydrochloride dissolved in 5 g of water was added and the reaction was conducted under nitrogen aeration. The aqueous solution viscosity of the resulting copolymer at 1.2 wt % was 80 cps. The results are shown in Table 1.

COMPARATIVE EXAMPLE 2

After placing 250 g of N-vinylacetamide in a glass reactor, 740 g of water was added thereto and dissolved. The dissolved oxygen was removed by nitrogen aeration in a 20° C. constant temperature bath, and then 0.1 g of 2,2'-azobis[2-(2-imidazolin-2-yl)propane] dihydrochloride dissolved in 10 g of water was added and the reaction was conducted under nitrogen aeration. After completion of the reaction, the product was dried at 50° C. for 5 hours. The water was thoroughly removed, and a miniature crusher was used to make a powder of 100 mesh or smaller. The 1.2 wt % aqueous solution viscosity of the resulting copolymer was 12 cps.

Comparative Examples 3–5

The monomers listed in Table 1 were reacted according to Comparative Example 1. The results are shown in Table 1.

TABLE 1

| Example | Monomer (1) (wt %) | Monomer (2) (wt %) | Monomer (3) (wt %) | 1.2 wt % aqueous solution viscosity (cps) | Infrared absorption spectrum characteristic absorption (cm$^{-1}$) |
|---|---|---|---|---|---|
| Ex. 1 | NVA (100) | — | — | 178 | 1636, 1560 |
| Ex. 2 | NVA (60) | AMps-Na (30) | AN (10) | 180 | 2241, 1635, 1558, 1486, 1375, 1210, 1042 |
| Ex. 3 | NVA (47) | AMps-Na (50) | AN (5) | 43 | 2240, 1636, 1560, 14.84, 1377, 1200, 1041 |
| Ex. 4 | NVA (70) | AMps-Na (30) | — | 53 | 1637, 1557, 1491, 1373, 1210, 1040 |
| Ex. 5 | NMVA (95) | — | MMA (5) | 55 | 1726, 1592, 1471, 1378 |
| Ex. 6 | NVF (78) | AMps-Na (20) | DMAAm (2) | 183 | 1650, 1540, 1500, 1373, 1200, 1038 |
| Ex. 7 | NVA (45) | MOES-Na (45) | MMA (10) | 84 | 1735, 1720, 1634, 1559, 1377, 1200, 1044 |
| Ex. 8 | NVF (85) | MOES-Na (10) | AN (5) | 134 | 2210, 1723, 1065, 1541, 1376, 1210, 1046 |
| Ex. 9 | NVA (75) | — | VA (25) | 28 | 1725, 1637, 1559 |
| Ex. 10 | NVA (60) | AMps-Na (20) | DMAAm (20) | 162 | 1640, 1500, 1377, 1200, 1041 |
| Comp. Ex. 1 | NVA (20) | AMps-Na (70) | AN (10) | 80 | |
| Comp. Ex. 2 | NVA (100) | — | — | 12 | |
| Comp. Ex. 3 | NVA (30) | AMps-Na (20) | MMA (50) | 128 | |
| Comp. Ex. 4 | NVA (70) | AMps-Na (20) | AN (10) | 314 | |
| Comp. Ex. 5 | NVA (70) | AMps-Na (20) | AN (10) | 13200 | |

NVA: N-vinylacetamide
NMVF: N-methyl-N-vinylacetamide
NVF: N-vinylformamide
NEVF: N-ethyl-N-vinylformamide
AMps-Na: Sodium 2-acrylamido-2-methyl-propanesulfonate
MOES-Na: Sodium 2-methacryloyloxyethylsulfonate
AN: Acrylonitrile
MMA: Methyl methacrylate
DMAAm: N,N-dimethylacrylamide
VA: Vinyl acetate

EXAMPLES 11–30 AND COMPARATIVE EXAMPLES 6–10

The copolymers obtained in Examples 1–10 and Comparative Examples 1–3 were used as concrete additives in the proportions listed in Table 2, giving the results listed in Table 3 as Examples 11–30 and Comparative Examples 6–10.

TABLE 2

| W/C (%) | S/C | W (parts by wt.) | C (parts by wt.) | S (parts by wt.) | G (parts by wt.) |
|---|---|---|---|---|---|
| 50 | 2.5 | 180 | 360 | 900 | 800 |

Cement (C): Ordinary Portland cement (specific gravity: 3.16)
Fine aggregate (S): Kinokawa river sand (specific gravity: 2.60)
Coarse aggregate (G): Takarazuka crushed stone (specific gravity: 2.63)
Water (W): Tap water

EXAMPLE 31

After placing 250 g of N-vinylacetamide in a glass reactor, 740 g of water was added thereto and dissolved. The dissolved oxygen was removed by nitrogen aeration in a 20° C. constant temperature bath, and then 0.125 g of 2,2'-azobis[2-(2-imidazolin-2-yl)propane] dihydrochloride dissolved in 10 g of water was added and the reaction was conducted under nitrogen aeration. After completion of the reaction, the product was dried at 50° C. for 5 hours. The water was thoroughly removed, and a miniature crusher was used to make a powder of 100 mesh or smaller. The 1.2 wt % aqueous solution viscosity of the resulting copolymer was 300 cps.

EXAMPLE 32

After placing 10 g of 2-acrylamido-2-methyl-propanesulfonic acid in a glass reactor, 445 g of water was added thereto and dissolved. The pH was adjusted to 8 with sodium hydroxide, and then 40 g of N-vinylacetamide and

TABLE 3

| | Concrete additive | | Water reducing agent | | Slump flow (cm) | | Segregation*[2] | Self-compactability*[3] |
|---|---|---|---|---|---|---|---|---|
| | Type | (%*[1]) | Type | (%*[1]) | 0 min. | 60 min. | | |
| Ex. 11 | Ex. 1 | 0.01 | *[5] | 4.0 | 61.0 | 60.3 | o | o |
| Ex. 12 | Ex. 1 | 0.06 | *[5] | 4.0 | 61.2 | 60.2 | o | o |
| Ex. 13 | Ex. 1 | 0.12 | *[5] | 4.0 | 60.8 | 60.2 | o | o |
| Ex. 14 | Ex. 1 | 0.12 | *[4] | 4.0 | 61.4 | 60.4 | o | o |
| Ex. 15 | Ex. 1 | 0.12 | *[5] | 4.0 | 61.2 | 61.1 | o | o |
| Ex. 16 | Ex. 1 | 0.12 | *[6] | 4.0 | 60.7 | 60.2 | o | o |
| Ex. 17 | Ex. 1 | 0.12 | *[7] | 4.0 | 61.0 | 60.1 | o | o |
| Ex. 18 | Ex. 1 | 0.12 | *[8] | 4.0 | 62.1 | 60.5 | o | o |
| Ex. 19 | Ex. 2 | 0.01 | *[5] | 2.0 | 63.0 | 62.1 | o | o |
| Ex. 20 | Ex. 2 | 0.01 | *[5] | 4.0 | 63.5 | 61.3 | o | o |
| Ex. 21 | Ex. 2 | 0.01 | *[5] | 6.0 | 64.0 | 62.0 | o | o |
| Ex. 22 | Ex. 2 | 0.03 | *[5] | 4.0 | 62.0 | 62.0 | o | o |
| Ex. 23 | Ex. 3 | 0.02 | *[5] | 4.0 | 63.5 | 63.5 | o | o |
| Ex. 24 | Ex. 4 | 0.03 | *[5] | 4.0 | 61.5 | 61.5 | o | o |
| Ex. 25 | Ex. 5 | 0.03 | *[5] | 4.0 | 61.8 | 61.8 | o | o |
| Ex. 26 | Ex. 6 | 0.03 | *[6] | 4.0 | 61.9 | 61.9 | o | o |
| Ex. 27 | Ex. 7 | 0.12 | *[7] | 4.0 | 62.3 | 61.2 | o | o |
| Ex. 28 | Ex. 8 | 0.10 | *[7] | 4.0 | 61.4 | 60.7 | o | o |
| Ex. 29 | Ex. 9 | 0.12 | *[5] | 2.0 | 61.2 | 60.1 | o | o |
| Ex. 30 | Ex. 10 | 0.12 | *[4] | 4.0 | 61.5 | 60.5 | o | o |
| Comp. Ex. 6 | Comp. Ex. 1 | 0.03 | *[5] | 4.0 | 63.0 | 62.0 | x | x |
| Comp. Ex. 7 | Comp. Ex. 2 | 0.03 | *[5] | 4.0 | 61.0 | 54.3 | x | o |
| Comp. Ex. 8 | Comp. Ex. 3 | 0.03 | *[5] | 4.0 | 51.2 | 43.3 | x | x |
| Comp. Ex. 9 | Comp. Ex. 4 | 0.03 | *[5] | 4.0 | 60.3 | 56.3 | o | o |
| Comp. Ex. 10 | Comp. Ex. 5 | 0.03 | *[5] | 4.0 | 59.8 | 44.2 | o | o |

*[1]: Weight percent with respect to cement
*[2]: Material segregation
Visually determined
o - no separation of aggregate and cement paste
x - separation of aggregate and cement paste
*[3]: Self-compactability property
Visually observed compacted state of concrete surface upon loading the produced concrete into a 10-cm diameter cylindrical frame and packing it without using a vibrator, leaving it to stand for 3 days and then releasing it.
o - virtually no gaps of 0 to 5 mm.
x - many gaps of 5 mm or greater
*[4]: Naphthalene sulfonate condensate (Mighty 2000WHX, product of Hanao KK.)
*[5]: Polycarboxylic acid base (Mighty 2000WHZ, product of Hanao KK.)
*[6]: Melamine sulfonate condensate (Mormaster F-300, product of Showa Denko KK.)
*[7]: Lignin sulfonate compound/polyol condensate (Pozorisu No. 70, product of Pozorisu KK.)
*[8]: Aromatic aminosulfonate base (Parikku SAO, product of Fujisawa Yakuhin KK.)

0.01 g of sodium hypophosphite were dissolved therein. After vigorous stirring in a 50° C. constant temperature bath and removal of the dissolved oxygen by nitrogen aeration, 0.5 g of 2,2'-azobis(2-amidinopropane) dihydrochloride dissolved in 5 g of water was added and the reaction was conducted under nitrogen aeration. The 1.2 wt % aqueous solution viscosity of the resulting copolymer was 384 cps.

EXAMPLE 33

After placing 112.5 g of N-vinylacetamide, 12.5 g of acrylonitrile and 0.0625 g of sodium hypophosphite in a glass reactor, 360 g of water was added thereto and dissolved. The dissolved oxygen was removed by nitrogen aeration in a 20° C. constant temperature bath, and then 0.2 g of 2,2'-azobis[2-(2-imidazolin-2-yl)propane] dihydrochloride dissolved in 10 g of water was added and the reaction was conducted under nitrogen aeration. After completion of the reaction, the product was dried at 50° C. for 5 hours. The water was thoroughly removed, and a miniature crusher was used to make a powder of 100 mesh or smaller. The 1.2 wt % aqueous solution viscosity of the resulting copolymer was 95 cps.

EXAMPLE 34

After placing 10 g of 2-acrylamido-2-methyl-propanesulfonic acid in a glass reactor, 445 g of water was added thereto and dissolved. The pH was adjusted to 8 with sodium hydroxide, and then 35 g of N-vinylacetamide, 5 g of acrylonitrile and 0.01 g of sodium hypophosphite were dissolved therein. After vigorous stirring in a 50° C. constant temperature bath and removal of the dissolved oxygen by nitrogen aeration, 0.5 g of 2,2'-azobis(2-amidinopropane) dihydrochloride dissolved in 5 g of water was added and the reaction was conducted under nitrogen aeration. The 1.2 wt % aqueous solution viscosity of the resulting copolymer was 290 cps.

EXAMPLE 35

After placing 35 g of 2-acrylamido-2-methyl-propanesulfonic acid in a glass reactor, 445 g of water was added thereto and dissolved. The pH was adjusted to 8 with sodium hydroxide, and then 10 g of N-vinylacetamide, 5 g of acrylonitrile and 0.01 g of sodium hypophosphite were dissolved therein. After vigorous stirring in a 50° C. constant temperature bath and removal of the dissolved oxygen by nitrogen aeration, 0.5 g of 2,2'-azobis(2-amidinopropane) dihydrochloride dissolved in 5 g of water was added and the reaction was conducted under nitrogen aeration. The 1.2 wt % aqueous solution viscosity of the resulting copolymer was 320 cps.

EXAMPLES 36–47

A concrete test was conducted to determine the effects of the polymers obtained in Examples 31–35. The proportions of the concrete are listed in Table 4, and the results of the evaluation are listed in Table 5. The slump flow value immediately after filling the slump cone with concrete (0 minutes) was adjusted to 55–65 cm by the amount of water reducing agent added.

TABLE 4

| W/C (%) | S/C | W (parts by wt.) | C (parts by wt.) | S (parts by wt.) | G (parts by wt.) |
|---|---|---|---|---|---|
| 50 | 2.75 | 100 | 200 | 550 | 550 |

TABLE 5

| | Concrete additive | Amount (C* %) | Water reducing agent | Amount (C* %) | Slump flow (cm) 0 min | Material segregation*[1] | Self-compactability*[2] |
|---|---|---|---|---|---|---|---|
| Comp. Ex. 11 | *[3] | 0.4 | *[4] | 9.0 | 40.0 | o | x |
| Comp. Ex. 12 | *[3] | 0.4 | *[5] | 4.5 | 55.0 | o | o |
| Ex. 36 | Ex. 31 | 0.1 | *[5] | 4.5 | 61.0 | o | o |
| Ex. 37 | Ex. 31 | 0.4 | *[5] | 4.5 | 60.2 | o | o |
| Ex. 38 | Ex. 31 | 0.8 | *[5] | 4.5 | 58.3 | o | o |
| Ex. 39 | Ex. 31 | 0.4 | *[4] | 4.5 | 60.4 | o | o |
| Ex. 40 | Ex. 31 | 0.4 | *[5] | 4.5 | 61.2 | o | o |
| Ex. 41 | Ex. 31 | 0.4 | *[6] | 4.5 | 60.7 | o | o |
| Ex. 42 | Ex. 31 | 0.4 | *[7] | 4.5 | 61.0 | o | o |
| Ex. 43 | Ex. 31 | 0.4 | *[8] | 4.5 | 60.5 | o | o |
| Ex. 44 | Ex. 32 | 0.4 | *[5] | 4.5 | 59.8 | o | o |
| Ex. 45 | Ex. 33 | 0.4 | *[5] | 4.5 | 60.0 | o | o |
| Ex. 46 | Ex. 34 | 0.4 | *[5] | 4.5 | 58.9 | o | o |
| Ex. 47 | Ex. 35 | 0.4 | *[5] | 4.5 | 63.0 | x | x |

*[1]: Visually determined
o - no separation of aggregate and cement paste
x - separation of aggregate and cement paste
*[2]: Visually observed compacted state of concrete surface upon loading the produced concrete into a 10 cm-diameter cylindrical frame and packing it without using a vibrator, leaving it to stand for 3 days and then releasing it.
o - virtually no gaps of 0 to 5 mm.
x - many gaps of 5 mm or greater
*[3]: Methyl cellulose (SFCA2000, product of Shinetsu Kagaku KK.)
*[4]: Napthalene sulfonate condensate (Mighty 2000WHX, product of Hanao KK.)
*[5]: Polycarboxylic acid base (Mighty 2000WHZ, product of Hanao KK.)
*[6]: Melamine sulfonate condensate (Mormaster F-300, product of Showa Denko KK.)
*[7]: Lignin sulfonate compound/polyol condensate (Pozorisu No. 70, product of Pozorisu KK.)
*[8]: Aromatic aminosulfonate base (Parikku SAO, product of Fujisawa Yakuhin KK.)

Fresh concrete containing a high-flow concrete additive according to the invention has the excellent effect of providing high flowability, self-compactability and segregation resistance, and reducing or rendering unnecessary compaction during placement.

We claim:

1. A high-flow concrete additive comprising a polymer containing:

40–89 wt % of a unit derived from a compound represented by the following general formula (1):

$$CH_2=CHNR^1COR^2 \qquad (1)$$

wherein $R^1$ represents a hydrogen atom and $R^2$ represents a methyl group,

10–50 wt % of a unit derived from a compound represented by the following general formula (2):

$$CH_2=CR^3X^1R^4SO_3X^2 \qquad (2)$$

wherein $R^3$ is a hydrogen atom or methyl group, $R^4$ is a linear or branched alkylene group of 1 to 4 carbon atoms, $X^1$ is CONH or COO, and $X^2$ is hydrogen, an alkali metal, ammonium salt or organic ammonium salt, and 1–30 wt % of a unit derived from a compound represented by the following general formula (3):

$$CH_2=CR^5X^3 \qquad (3)$$

wherein $R^5$ a hydrogen atom or methyl group and $X^3$ is CN, the total of the units derived from the compounds represented by general formulas (1) to (3) being 100 wt %.

2. A high-flow concrete additive according to claim 1, which comprises a polymer with a 1.2 weight percent aqueous solution viscosity in the range of 20–20,000 cps when the polymer dissolved in a cement supernatant liquid is measured with a B viscometer.

3. A high-flow concrete additive according to claim 2, which comprises a polymer with a 1.2 weight percent aqueous solution viscosity in the range of 20–2000 cps when the polymer dissolved in a cement supernatant liquid is measured with a B viscometer.

4. A high-flow concrete additive according to claim 3, which comprises a polymer with a 1.2 weight percent aqueous solution viscosity in the range of 20–200 cps when the polymer dissolved in a cement supernatant liquid is measured with a B viscometer.

* * * * *